Figure 1:
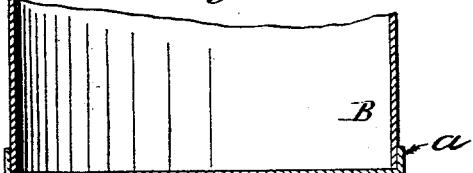

(No Model.)

O. S. FELLOWS.
MANUFACTURE OF SHEET METAL CANS.

No. 579,969. Patented Apr. 6, 1897.

Witnesses:
Louis H. Johnson
D. W. Gardner

Inventor:
Olin S. Fellows
By his Attorney
George William Miatt

UNITED STATES PATENT OFFICE.

OLIN S. FELLOWS, OF MIDDLETOWN, NEW YORK.

MANUFACTURE OF SHEET-METAL CANS.

SPECIFICATION forming part of Letters Patent No. 579,969, dated April 6, 1897.

Application filed July 19, 1895. Serial No. 556,516. (No model.)

*To all whom it may concern:*

Be it known that I, OLIN S. FELLOWS, a citizen of the United States, residing at Middletown, in the county of Orange and State of New York, have invented certain new and useful Improvements in the Manufacture of Sheet-Metal Cans, of which the following is a specification sufficient to enable others skilled in the art to which the invention appertains to make and use the same.

By my invention I dispense with the crimping of the parts in the manufacture of sheet-metal cans and at the same time obtain stronger and more perfect joints. The invention consists in the method of rigidly securing end plates to can-bodies by shrinking one part upon the other for the purpose of hermetically sealing such joints with solder, as hereinafter described and claimed.

I am aware that heretofore the parts of a can have been forced into contact by mechanical means, as by crimping, which I expressly desire to avoid, since it is objectionable in that it distorts the metal, bending both parts over in the same direction and holding them by slight frictional contact only, whereas by my method of contracting one part upon the other no distortion of either part is possible, and it is obvious that the opposed surfaces of metal necessarily each exert a comparatively high degree of pressure against the other. I am not aware that one part of the can has been thus expanded by heat and then applied to the other unexpanded part in such manner that the shrinkage of one part upon the other will form a closer contact of surfaces and a stronger joint than is attainable by mechanical means alone. Neither am I aware that solder has been applied to the part not expanded, so that the contraction of the part expanded will compress the solder into intimate contact with the surfaces to be sealed, thereby attaining a more perfect joint with less solder.

I am aware that it is old to expand one piece of metal for the purpose of contracting it upon another for various purposes, but I am not aware that the expansion and contraction of sheet metal has been substituted for the crimping operation in the manufacture of sheet-metal cans for the purpose of securing an end cap to a can-body by a stronger and more perfect hermetically-sealed joint than has heretofore been attainable.

It will thus be seen that a distinguishing feature of my invention is that I dispense entirely with the crimping of the parts together, an operation heretofore practically indispensable, and at the same time attain new results of practical importance and value.

In carrying out my invention end plates having exterior flanges may be expanded by heat and then shrunk upon the can-body, or the latter may be expanded by heat and then shrunk upon interior end plates, the resulting compression together of the opposed surfaces affording the same advantages in either case.

Figure 2:
Figure 3:
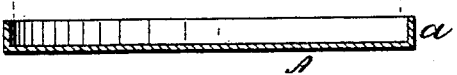
Figure 4:
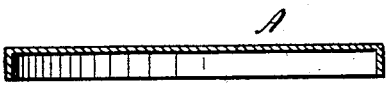
Figure 5:
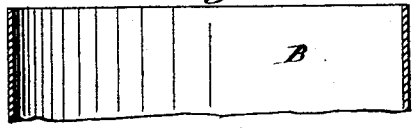
Figure 6:
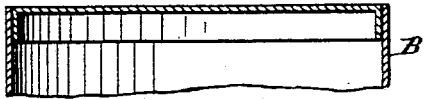
Figure 7:
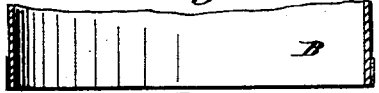
Figure 8:
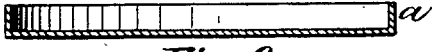
Figure 9:
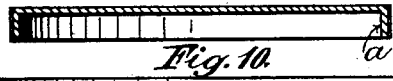
Figure 10:
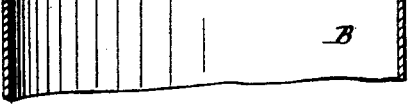

In the accompanying drawings, which are symbolical in character, Figure 1 represents a sectional elevation of one end of a can-body upon which has been shrunk an end cap having an exterior flange; Figs. 2 and 3, sectional elevations of the end of the can-body and end cap, the latter being represented arbitrarily as expanded by heat prior to its application to the can-body; Fig. 4, a sectional elevation of an end plate having exterior flange, and Fig. 5 a sectional elevation of one end of the can-body expanded. Fig. 6 is a sectional elevation of the parts shown in Figs. 4 and 5, the can-body having been shrunk upon the end cap. Figs. 7 and 8 represent arbitrarily the end of a can-body to the edge of which solder has been applied and an end cap which has been expanded by heat preparatory to shrinking it upon the soldered end of the can-body. Figs. 9 and 10 represent arbitrarily an end plate to the outer surface of the flange of which solder has been applied and a can-body which has been expanded by heat preparatory to shrinking it upon the soldered flange of the end plate.

In carrying out my invention the can-body and end caps may be prepared in any well-known or suitable manner.

If an end cap having an exterior flange *a* is to be applied to the can-body B, the cap A is made slightly smaller in interior diameter than the exterior diameter of the can-body, and is then expanded by heat sufficiently to allow it to be applied to the cooler end of the can-body, when the subsequent shrinkage of the end cap will draw the flange tightly against the edge of the can-body with a force proportionate to the degree of expansion resorted to. If, on the other hand, the end cap A is to fit inside the can-body, the latter is made of less interior diameter than the exterior diameter of the end plate and is expanded sufficiently to receive the end plate, when the subsequent shrinkage of the can-body secures the end plate firmly in position. In either case a positive contact of the parts is attained by this means sufficient to hold the parts firmly together during handling and manipulation until sealed hermetically by the application of melted solder to an edge of the joint. The solder may be applied either internally or externally of the can and will be quickly drawn in between the opposed surfaces by capillary attraction to unite them when cool.

A flux may be applied to the part of the can upon which the other part is to be shrunk to facilitate the drawing in and distribution of the melted solder, if desired, but this is not indispensable.

Another way of carrying out my invention is to apply melted solder to the part upon which the other part is to be shrunk, allowing the solder to harden, then expand by heat the unsoldered part and shrink it onto the soldered part, and then apply sufficient heat to melt the solder, so that it will seal the joint when cold. This may be accomplished by applying the solder to the edge of the can-body, as in Fig. 7, and shrinking on the end cap, or the solder may be applied to the flange of the end cap when the can-body is to be shrunk upon the end cap, as in Figs. 4, 5, 9, and 10. In either case but a small amount of solder is required, owing to the close joint which the shrinking of one part upon the other affords.

What I claim as my invention, and desire to secure by Letters Patent, is—

1. In the manufacture of sheet-metal cans the method herein set forth of securing the end caps to the can-bodies without crimping the parts together, consisting in applying melted solder to one part and allowing it to harden thereon, then heating the other part to expand the same, applying the expanded part to the part having the solder and shrinking it thereon by cooling, and finally heating both parts simultaneously to melt the solder to hermetically seal the joint when cool, substantially as described.

2. In the manufacture of sheet-metal cans the method herein set forth of securing the end caps to the can-bodies without crimping the parts together, consisting in applying melted solder to the edge of the can-body and allowing it to harden thereon, then heating the flanged cap to expand the same, applying the cap to the can-body to confine the solder between the flange of the cap and the can-body, then cooling the cap to shrink the same upon the can-body, and finally heating both parts simultaneously to melt the solder to hermetically seal the joint when cool, substantially as described.

OLIN S. FELLOWS.

Witnesses:
D. W. GARDNER,
GEORGE WILLIAM MIATT.